Figure 1:
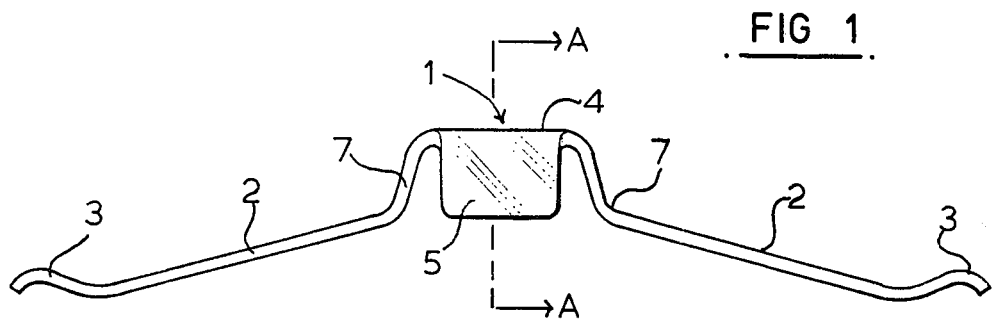

United States Patent [19]

Heinz et al.

[11] 4,049,087
[45] Sept. 20, 1977

[54] FRICTION PAD ASSEMBLIES FOR SLIDING CALIPER DISC BRAKES

[75] Inventors: Kurt Erich Heinz, Neuwied; Horst Willi Klassen, St. Sebastian, both of Germany

[73] Assignee: Girling Limited, Birmingham, England

[21] Appl. No.: 643,826

[22] Filed: Dec. 23, 1975

[30] Foreign Application Priority Data

Dec. 24, 1974  United Kingdom ............... 55726/74

[51] Int. Cl.² ............................................. F16D 65/00
[52] U.S. Cl. ................................................... 188/73.5
[58] Field of Search .................... 188/73.3, 73.5, 73.1, 188/72.4, 205 A, 250 E

[56] References Cited

U.S. PATENT DOCUMENTS

| 3,616,878 | 11/1971 | Girauldon | 188/73.5 |
| 3,768,605 | 10/1973 | Carre | 188/73.5 |
| 3,917,033 | 11/1975 | Roth et al. | 188/73.3 |

FOREIGN PATENT DOCUMENTS

| 1,555,270 | 12/1968 | France | 188/73.3 |
| 1,189,333 | 3/1965 | Germany | 188/73.5 |
| 42,252 | 11/1971 | Japan | 188/73.5 |
| 1,037,238 | 7/1966 | United Kingdom | 188/73.3 |

*Primary Examiner*—George E. A. Halvosa
*Attorney, Agent, or Firm*—Scrivener, Parker, Scrivener & Clarke

[57] ABSTRACT

The present specification describes and claims a friction pad assembly for use in a sliding caliper disc brake and a sliding caliper disc brake incorporating such an assembly. The friction pad assembly comprises a backing plate, a pad of friction material secured to the backing plate, and a leaf spring, a central clip portion and two oppositely directed arms forming said leaf spring, the leaf spring being attached to the backing plate by means of said central clip portion. When the assembly is incorporated in a sliding caliper disc brake which comprises a torque member and a caliper member, the leaf spring engages the caliper member both pressing the friction pad assembly down onto guides in the torque member and biasing the torque member and caliper member apart to take up any clearance. Thus the possibility of the assembly rattling in the brake and the torque member and caliper member rattling together, is reduced.

3 Claims, 13 Drawing Figures

FRICTION PAD ASSEMBLIES FOR SLIDING CALIPER DISC BRAKES

The present invention relates to a friction pad assembly for use in sliding caliper disc brakes and a sliding caliper disc brake incorporating such a friction pad assembly.

In most constructions of caliper disc brakes, the friction pads are supported on or between guides to which forces due to braking are transmitted from the pad and hence to the vehicle frame. It is necessary to provide some degree of clearance at these guides to permit the pads to slide towards and away from the disc during braking and to ensure freedom from pad seizure. This can result in the pad rattling in these guides. To reduce this problem it is known to incorporate a resilient means, usually a spring, to bias the pad against one side of the guide. Problems with such resilient means specifically springs, are that the springs heretofore known are subject to many of the following:

1. They do not exert substantially the same force between pad and guide throughout the life of the pad.
2. They are not easy to assemble in and dismantle from a brake.
3. They give rise to spurious loads and couples that tend to displace the pad from its desired position and attitude in a brake caliper.
4. They cut, or otherwise damage the flexible rubber boots which are provided to protect the piston or pistons in a brake caliper.
5. They are not particularly cheap to manufacture or install.

The aim of the present invention is to provide a friction pad assembly which includes an anti-rattle spring arrangement which readily solves all of these problems.

According to the present invention there is provided a friction pad assembly comprising a backing plate and a pad of friction material secured thereto, a leaf spring comprising a central clip portion and two oppositely directed arms, being attached to said backing plate by means of said central clip portion.

In a preferred embodiment of the present invention the backing plate has a tab or projecting part thereof which is free of friction material and which is located in the middle region of what will be the circumferentially outermost portion of the assembly in relation to the disc when inserted in a disc brake. Further, the sides of the backing plate are provided with laterally projecting shoulders. The central clip portion of the leaf spring clips over the tab of the backing plate and the two oppositely directed leaf spring arms extend in directions substantially parallel to the plane of the backing plate, the planes of the spring arms being substantially normal to the plane of the backing plate. Further, the free ends of the leaf spring arms are curved and the leaf spring arms are tapered so that they are narrower in the region of the central clip portion than at the outer free ends. This tapering of the arms of the leaf spring increases the stability of the spring on the backing plate when in use, in a disc brake. This is particularly so when the spring is in use in a sliding caliper disc brake comprising a torque member and a caliper member. The widened ends of the spring arms then engage against the caliper member and move with the backing plate, relative to the caliper member, as the brake is operated, the widened ends of the spring arms preventing the leaf spring from tipping due to frictional forces between the widened ends and the caliper member and thus preventing the leaf spring from inadvertently detaching itself from the backing plate.

To further aid the attachment of the leaf spring to the backing plate the tab of the backing plate may be provided with a small deformation into which part of the central clip portion of the leaf spring can fit.

The spring is thus located on the pad backing plate during assembly to the brake, so that it cannot slip and damage the flexible boot normally provided in a disc brake to protect the cylinder and piston against the ingress of dirt and moisture. Also, if the spring is permanently attached to the pad back-plate it cannot be mislaid during pad replacement and must always be replaced when the pads are changed, ensuring no degradation of performance. The attachment assures that, in use, the attitude of the spring to its associated pad backing plate remains constant, irrespective of the state of pad wear, so avoiding spurious displacements of the pad caused by offset spring forces.

According to a further feature of the present invention there is provided a friction pad assembly in combination with a sliding caliper disc brake, the brake comprising a torque member and a caliper member incorporating at least one hydraulic actuator, the caliper member being attached to the torque member for sliding movement relative thereto and arranged to act on the friction pad assembly which is located in a recess in the torque member, the friction pad assembly comprising a backing plate, a pad of friction material and a leaf spring, the leaf spring comprising a central clip portion and two oppositely directed arms, and being attached to said backing plate by means of said central clip portion, the two oppositely directed arms engaging against the caliper member.

Thus, when a friction pad assembly constructed in accordance with the present invention is in use in a sliding caliper disc brake e.g. of the sliding pin type, the outwardly extending arms of the leaf spring press against the caliper member and are deflected somewhat from their free attitude. The arms thus exert resilient forces against the caliper member, the reaction to the sum of which forces appears at the spring attachment point on the backing plate, thus pressing the friction pad assembly down on guides in the torque member. The spring thus has a two-fold purpose, to bias the friction pad assembly relative to the caliper member and to effectively bias the caliper member relative to the torque member. Thus the spring acts both to prevent the friction pad assembly rattling in the guides in the torque member and to reduce the possibility of rattling occurring between the caliper member and torque member. This latter source of rattling is inherent in any sliding caliper disc brake as a clearance must be provided on the guides which control the sliding movement of the caliper member to ensure freedom from seizure or jamming. For example, in a sliding caliper disc brake of the sliding pin type, guide pins on the caliper member pass with clearance through bores in the torque member, and in accordance with the further feature of the present invention the pins will be biased against the walls of the bores.

It has previously been known to achieve this duplication of function, but by means of a plate spring which is not attached to the backing plate and which suffers from all the problems itemised hereabove.

The spring that forms part of the friction pad assembly of the present invention preferably includes a central clip portion from which extend the spring arms, the central clip portion comprising a planar base portion from each side of which depends a leg, one leg being substantially normal to the base portion and the other leg being angled towards said one leg. In use the legs engage one on each side of a tab on the backing plate.

Whilst the friction pad assembly according to the present invention can be used to best advantage in a sliding caliper disc brake, in accordance with the further feature of the present invention it may also be used with advantage in any other type of disc brake to overcome the problems itemised hereabove. However in such other types of disc brake the spring will have only one function. That is, to prevent the friction pad assembly rattling on its guides in the brake.

Figure 2:
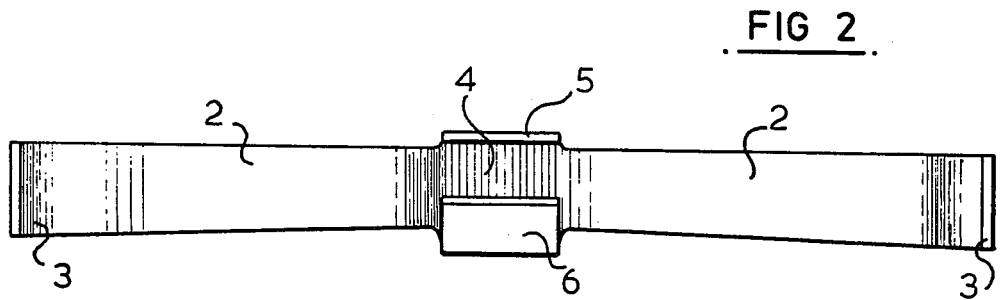
Figure 3:
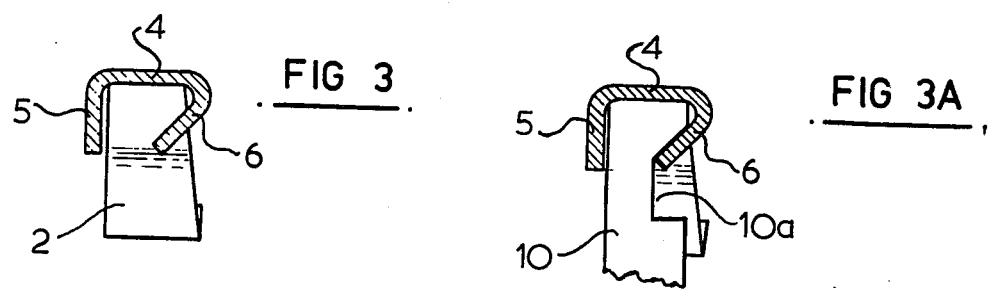
Figure 3A:
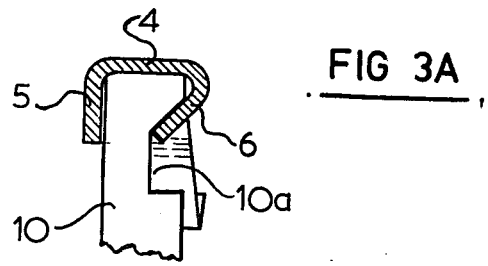
Figure 4:
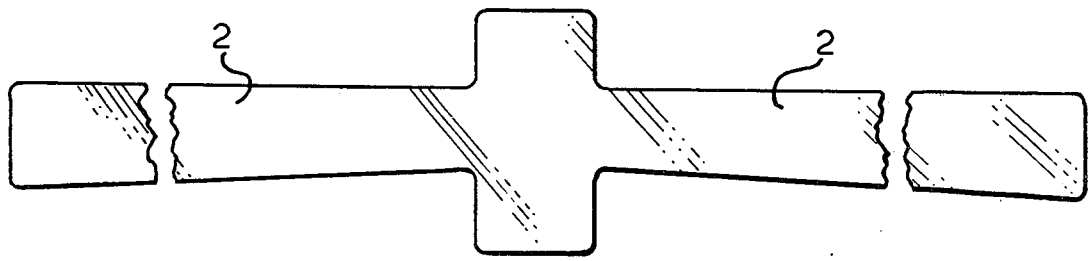
Figure 5:
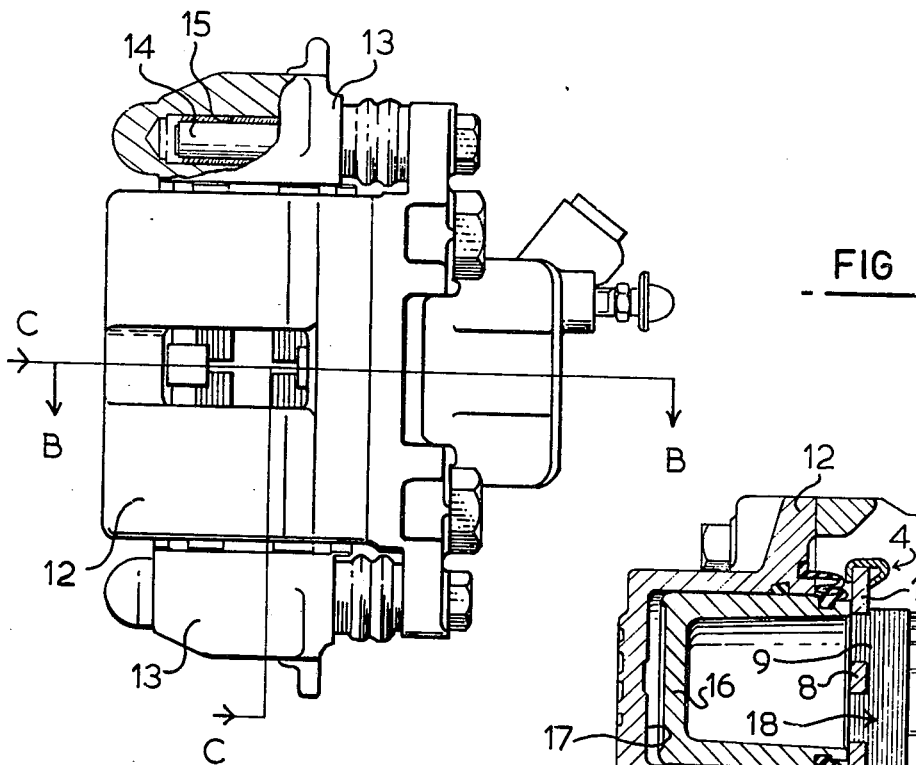
Figure 6:
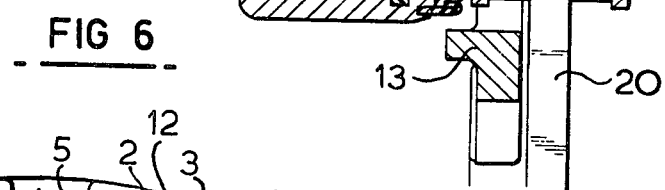
Figure 7:
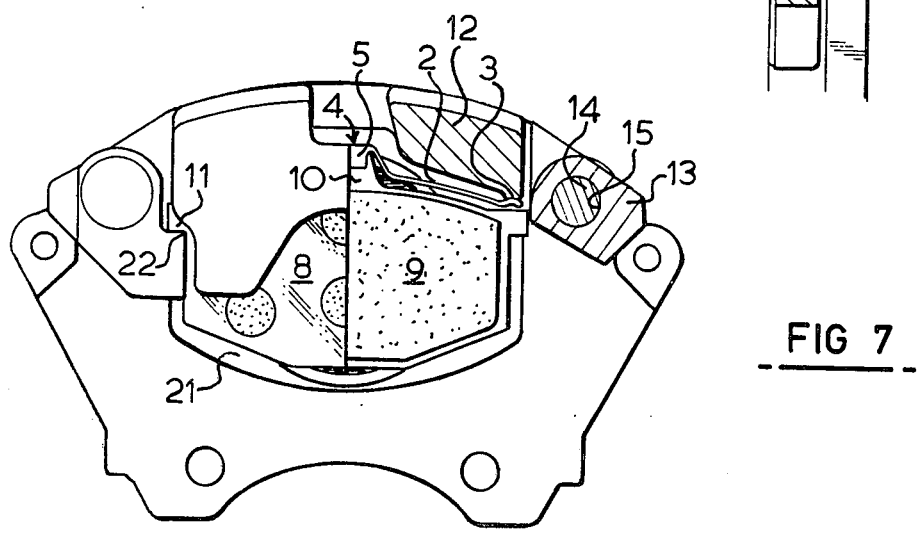
Figure 8:
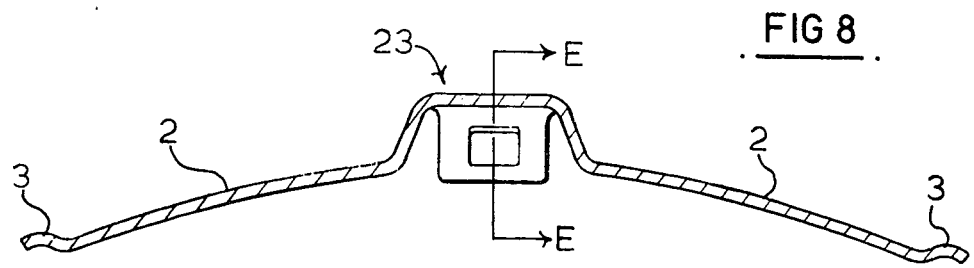
Figure 9:
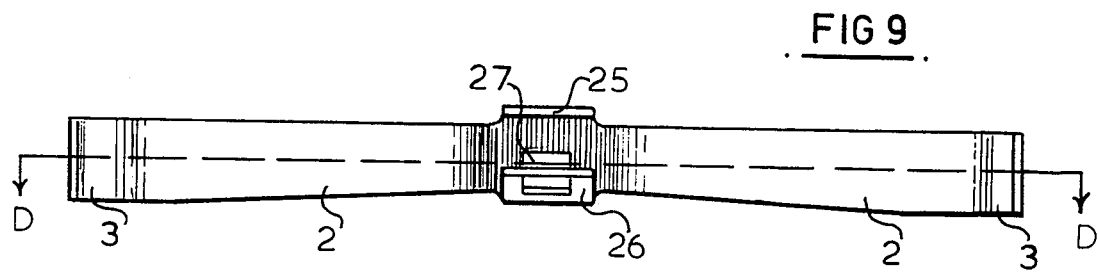
Figure 10:
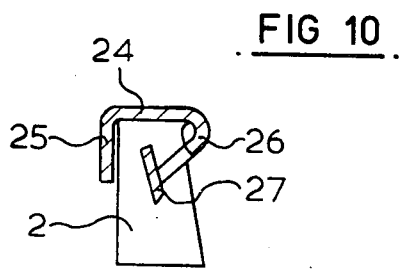
Figure 10A:
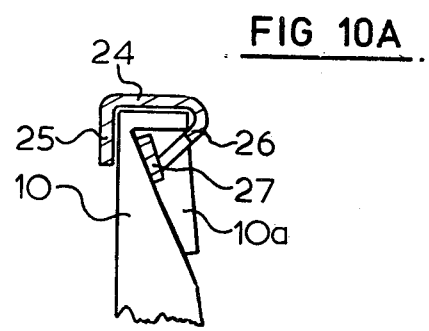
Figure 11:
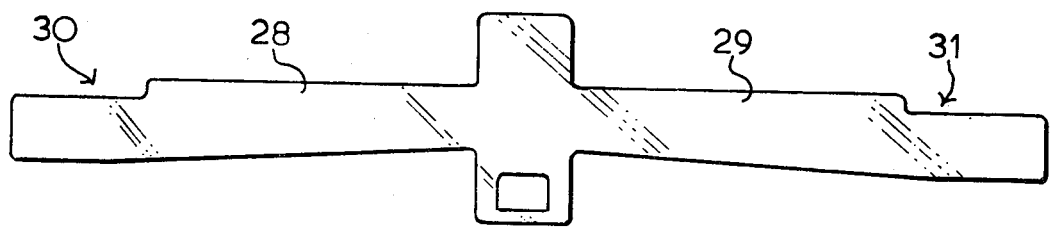

The present invention will now be further described, by way of example, with reference to the accompanying drawings, in which:

FIG. 1 is a frontal view of one embodiment of leaf spring for use in a friction pad assembly constructed in accordance with the present invention, FIG. 2 is an inverted plan view of the spring of FIG. 1, FIG. 3 is a sectional view of the spring of FIG. 1 taken along line A—A of FIG. 1, FIG. 3A is the sectional view of FIG. 3 with the spring engaging a backing plate, FIG. 4 illustrates a blank from which the leaf spring of FIGS. 1 to 3 can be pressed, FIG. 5 is a plan view of a sliding caliper disc brake incorporating friction pad assemblies utilizing the spring of FIGS. 1 to 3, FIG. 6 is a cross sectional view of the brake of FIG. 5 taken along line B—B of FIG. 5, FIG. 7 is a front view of the brake of FIG. 5, cutaway along line C—C of FIG. 5, FIG. 8 is a sectional view of a further embodiment of leaf spring for use in a friction pad assembly constructed according to the present invention, taken along line D—D in FIG. 9, FIG. 9 is an inverted plan view of the spring of FIG. 8, FIG. 10 is a sectional view of the complete spring of FIG. 8 taken along line E—E of FIG. 8, FIG. 10A is the sectional view in FIG. 10 with the spring engaging a backing plate; and FIG. 11 illustrates a blank from which a modified form of the leaf spring of FIG. 8 can be pressed.

FIGS. 1 to 4 of the accompanying drawings illustrate a leaf type spring for use in a friction pad assembly constructed according to the present invention. The leaf spring comprises a central clip portion generally designated 1 and two oppositely directed arms 2, the free ends 3 of which arms are curved.

The central clip portion 1 has, in transverse cross section (FIG. 3), a generally inverted U-shape. The inverted U-shape has a substantially planar base section 4 from each side of which depends a leg (5, 6) leg 5 being substantially normal to base section 4 and leg 6 being angled towards leg 5. As seen in FIG. 1 the legs 5 and 6 are generally rectangular planar members integrally formed with the base section 4.

Also as viewed in FIG. 1, the arms 2 which are integrally formed with the base section 4 of the central clip portion 1, bend downwards close to the base section 4 and at point 7 (FIG. 1) they bend outwards relative to the base section. The arms 2 are tapered (FIG. 3) the arms being widest at their respective free ends 3.

The spring of FIGS. 1 to 4 is used in a friction pad assembly, parts of which are evident in FIGS. 5 and 6. The friction pad assembly also comprises a backing plate 8 and a pad 9 of friction material. The backing plate 8 has a tab 10 which extends upwardly from the upper edge (as viewed in FIGS. 6 and 7) of the backing plate, the tab being free of friction material. Also, the backing plate is provided with a pair of laterally projecting shoulders 11 (only one of which is evident from FIG. 7), the function of which will be described later. The central clip portion 1 of the spring is clipped onto the tab 10 of the backing plate, leg 6 of the central clip portion being flexed to grip the backing plate. Thus, the arms 2 of the leaf spring extend along the upper edge of the backing plate, the plane of the arms 2 being substantially normal to the plane of the backing plate.

In an alternative embodiment (see FIG. 3a) the tab 10 is provided with a recess 10a into which leg 6 of the central clip portion 1 is fitted when the central clip portion engages over tab 10. Alternatively some other deformation may be provided on tab 10 to further secure the spring to the backing plate.

FIGS. 5 to 7 illustrate a sliding caliper disc brake of the sliding pin type, in which two friction pad assemblies are incorporated utilizing the leaf spring of FIGS. 1 to 3. The disc brake comprises a caliper member 12 and a torque member 13, the caliper member 12 being provided with pins 14 which slide in bores 15 in the torque member 13 (only one pin is evident in FIG. 5). As seen in FIG. 6 the caliper member 12 includes a hydraulically operable piston 16 which can be axially moved by hydraulic pressure in cylinder 17 to act on friction pad assembly 18 (FIG. 6), caliper member 12 sliding relative to torque member 13 causing friction pad assemblies 18 and 19 to grip opposite sides of a disc 20. The friction pad assemblies 18 and 19 are located in recesses 21 in the torque member 13 (FIG. 7), the laterally projecting shoulders 11 of the backing plate 8 engaging on shoulders 22 in the sides of the recesses 21, which shoulders 22 act as guides for the friction pad assemblies. As seen in FIG. 7 the free ends 3 of the leaf spring attached to each friction pad assembly engage against the caliper member 12 thus both pressing the friction pad assemblies down onto the shoulders 22 preventing or reducing pad rattle, and also pressing up on the caliper member 12 to thus take up any tolerance between pins 14 and bores 15 so preventing or reducing rattle between the caliper member and the torque member.

Thus, the leaf spring of a friction pad assembly constructed according to the present invention replaces the separate caliper member bias spring and pad anti-rattle springs utilized in previously known arrangements.

As an alternative to the leaf spring of FIGS. 1 to 4, a leaf spring as illustrated in FIGS. 8 to 10 or constructed from the blank illustrated in FIG. 12, can be used in a friction pad assembly constructed according to the present invention. The leaf spring illustrated in FIGS. 8 to 10 differs from the spring of FIGS. 1 to 4, only in respect of the central clip portion 23. Other like parts are indicated by the same reference numerals as used in FIGS. 1 to 4. As can be seen in FIG. 10 the central clip portion has an inverted U-shaped cross section formed by a substantially planar base section 24 from each end of which depends a leg (25, 26), leg 25 being substantially normal to the base section 24 and leg 26 being angled towards leg 25. This construction is the same as the spring of FIGS. 1 to 4. However leg 26 has a rectangular section 27 bent out therefrom towards the base section 24 and this rectangular section, as can be seen in FIG. 10A, engages in the recess 10a in tab 10 to prevent the spring from being inadvertently unclipped from the backing plate of the friction pad assembly. Whilst section 27 is rectangular any other shaped section can of course be pressed from leg 26 to perform the same function.

The blank illustrated in FIG. 11 can produce a leaf spring similar to the spring illustrated in FIGS. 8 to 10. The only difference is that the end regions of the arms 28, 29 of the spring have cutaway sections 30, 31 which are merely provided to cater for the brake design in which the spring is to be used.

As can be seen from FIGS. 2, 4 and 9, the arms of the leaf spring used in the present invention are tapered so that they are widest at their free ends. This tapering is to provide for stability of the spring on the backing plate. When the friction pad assembly is located in a sliding caliper brake the free ends 3 of the spring, as can be seen in FIG. 7, engage the caliper member 12 of the brake and when the brake is operated a certain amount of relative movement occurs between the caliper member and the spring. The friction between the caliper member 12 and the free ends 3 of the spring could cause the spring to tip and possibly unclip the spring from the backing plate of the friction pad assembly, and to prevent this happening the arms of the spring are tapered so as to be relatively wide at their free ends.

In known sliding caliper brakes which are provided with a spring to purely prevent rattle between the torque member and caliper member, the disadvantage arises that when the caliper member is removed from the torque member there is the danger that the spring will become displaced and will possibly cut the dirt seal provided on the hydraulic actuator. This is of course undesirable and the friction pad assembly of the present invention advantageously removes this danger as the spring is secured to the backing plate preventing random movement of the spring when the caliper member is separated from the torque member.

We claim:

1. A combination of friction pad assembly and a sliding caliper disc brake, the brake comprising a torque member and a caliper member, the caliper member being attached to the torque member for sliding movement relative thereto and arranged to act on the friction pad assembly which is located in a recess in the torque member, the friction pad assembly comprising a backing plate, a pad of friction material secured to the backing plate and a leaf spring securely attached to the backing plate prior to installation of the assembly in the disc brake, the leaf spring comprising a central clip portion and two oppositely directed arms, the arms being integrally formed with the central clip portion and extending substantially parallel to the plane of the backing plate, the flat surfaces of the arms being substantially normal to the plane of the backing plate, the central clip portion having, in transverse cross-section, a generally inverted u-shape comprising a substantially planar base section from each side of which depends a leg, one leg being substantially normal to the base section and the other leg being angled towards said one leg, the legs engaging one on either side of a tab which is free of friction material and projects from an edge of the backing plate, said other leg engaging into a recess in the tab, the two arms of the spring engaging the caliper member whereby the friction pad assembly is held in the recess in the torque member and the caliper member and torque member are biased apart, the pad assembly and brake being so designed that the spring at all times is outside the area which, when the brake is in use, is swept by the disc.

2. The combination of claim 1 wherein the flat surfaces of the arms taper so that they are wider in the direction of their free ends than at their ends adjacent said clip portion.

3. A combination of a friction pad assembly and a sliding caliper disc brake, the brake comprising a torque member and a caliper member, the caliper member being attached to the torque member for sliding movement relative thereto and arranged to act on the friction pad assembly which is located in a recess in the torque member, the friction pad assembly comprising a backing plate, a pad of friction material secured to the backing plate and a leaf spring securely attached to the backing plate prior to installation of the assembly in the disc brake, the leaf spring comprising a central clip portion and two oppositely directed arms, the arms being integrally formed with the central clip portion and extending substantially parallel to the plane of the backing plate, the flat surfaces of the arms being substantially normal to the plane of the backing plate, the central clip portion having, in transverse cross-section, a generally inverted u-shape comprising a substantially planar base section from each side of which depends a leg, one leg being substantially normal to the base section and the other leg being angled towards said one leg, the legs engaging one on either side of a tab which is free of friction material and projects from an edge of the backing plate, said other leg together with a portion of said other leg which is bent out of the plane of said other leg engaging into a recess in the tab, the two arms of the spring engaging the caliper member whereby the friction pad assembly is held in the recess in the torque member and the caliper member and torque member are biased apart, the pad assembly and brake being so designed that the spring at all times is outside the area which, when the brake is in use, is swept by the disc.

* * * * *